United States Patent [19]

Salonimer

[11] 4,091,412
[45] May 23, 1978

[54] TARGET DESIGNATION SYSTEM

[75] Inventor: David J. Salonimer, Huntsville, Ala.

[73] Assignee: The United States of America as represented by the Secretary of the Army, Washington, D.C.

[21] Appl. No.: 319,249

[22] Filed: Dec. 29, 1972

Related U.S. Application Data

[63] Continuation of Ser. No. 687,396, Dec. 1, 1967, abandoned.

[51] Int. Cl.² .................................................. H04N 3/00
[52] U.S. Cl. ................................... 358/108; 358/113; 250/203 CT; 356/5; 250/199
[58] Field of Search ................... 178/6.8; 346/33; 358/95, 113, 108, 109; 250/199, 203, 203 CT; 356/5; 244/3.16

[56] References Cited

U.S. PATENT DOCUMENTS

| 3,274,608 | 9/1966 | Ewing | 346/33 |
| 3,305,633 | 2/1967 | Chernoch | 178/6.8 |
| 3,380,358 | 4/1968 | Neumann | 256/5 |
| 3,527,949 | 9/1970 | Hath | 250/199 |
| 3,689,156 | 9/1972 | Kerpchar | 250/199 X |
| 3,696,248 | 10/1972 | Cunningham | 250/203 R |
| 3,778,007 | 12/1973 | Kearney | 244/3.16 |
| 3,813,553 | 5/1974 | Grossman | 250/199 X |

Primary Examiner—Robert L. Griffin
Assistant Examiner—Edward L. Coles
Attorney, Agent, or Firm—Nathan Edelberg; Robert P. Gibson; Robert C. Sims

[57] ABSTRACT

A system including a pulsed laser for illuminating targets. A detector has a shutter synchronized by a radio link from the laser, so that the shutter allows the detector only to be energized when the laser pulses.

1 Claim, 9 Drawing Figures

TARGET DESIGNATION SYSTEM

Dedicatory Clause

The invention described herein may be manufactured, used, and licensed by or for the Government for governmental purposes without the payment to me of any royalty thereon.

This is a continuation of Ser. No. 687,396, filed Dec. 1, 1967, now abandoned.

BACKGROUND OF THE INVENTION

This invention is in the field of ground target designators for airborne vehicles.

Close air support of ground operations is seriously inhibited by the difficulty of acquiring targets from the air. With high speed aircraft there is generally insufficient time for airborne personnel to spot targets unless the targets are very large, and/or of shapes and contrasts readily identified from the air. Targets which are small, such as vehicles, or are subtly colored, camouflaged or partially or wholly covered from view from above, are seldom detected from fighter or bomber aircraft. In the case of slower moving aircraft, such as light spotter craft or helicopters, the time needed to identify a target from background exposes the aircraft to hostile ground fire. Moreover, such aircraft themselves are not ordinarily weapons carriers.

In present military tactics, smoke emitting devices are often used as target markers. These methods suffer from disadvantages such as: (1) the enemy is warned well in advance when and where the attack will be; (2) the smoke emitters are difficult to position in the hostile area at the psychological moment when they are most needed; (3) placing the smoke emitters often exposes the target spotter (whether ground based or in a light aircraft) to hostile fire; (4) the smoke may be dispersed by winds or vegetation cover in the target area.

SUMMARY OF THE INVENTION

This invention is a target designation system employing laser illumination of said target and an imaging detector for displaying an area including said target, with the laser illumination relfected from said target being visible on said detector. The system is particularly useful in close ground support operations by, aircraft, but has other uses, as will become obvious from the following description.

An object of the invention is to provide a target designator using a laser target illuminator and an imaging detector for reflected illumination from said target.

Another object is to provide a target designator using a pulsed laser for target illumination and an imaging detector for reflected illumination from targets, and with a shutter associated with said detector for admitting illumination, including reflected illumination from targets, in timed relation to the pulses from the laser.

BRIEF DESCRIPTION OF THE DRAWINGS

In the drawings, like numerals will be used to designate the same or corresponding elements of the various figures.

DESCRIPTION OF THE PREFERRED EMBODIMENT

Figure 1:
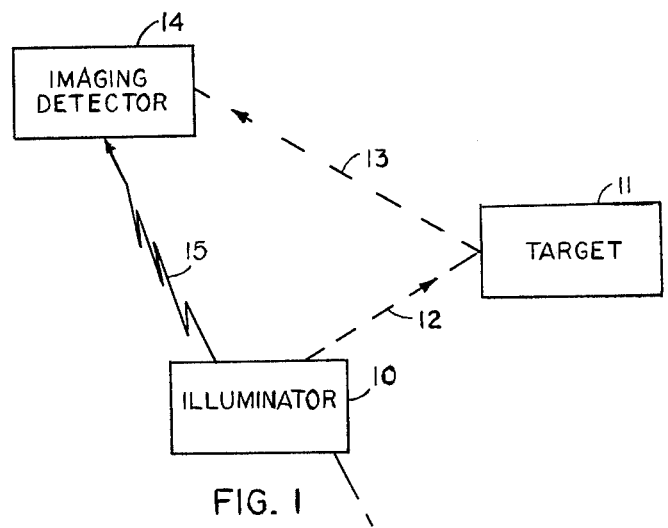
FIG. 1 is a schematic showing of one embodiment of the invention.

The Target Designation System herein described overcomes the limitations of known systems by affording long standoff distances for both spotter and potential support personnel and by using illumination of such a character and in such a way as to render it very difficult for the enemy to detect.

This system may be utilized for rescue operations, covert landing and material supply operations, aircraft navigation (where illuminators mark certain land locations) direction of troop movements, and fire concentration (where commanders use illuminators to designate approaches in combat zones to troops with portable receivers) and to guide civilian and military aircraft landing in situations of low visibility.

The illumination is provided by a pulsed laser, with a very short-duration, high-power pulse. The color purity of the laser enables the use of a narrow spectral band, optical filter on the receiver, providing thereby a significant reduction of natural light entering the receiver and competing with the signal.

The heart of the receiver is an electronic imaging sensor with high sensitivity and the ability to electronically store a picture for a short time. The initial section of this tube is electronically shutterable. The shutter will permit the selection of instants and durations of receiver exposure to the scene. The receiver must be capable of high image amplification. The shutter is activated in synchronism with the regular TV scanner beam (for TV cameras) and otherwise frequent enough to produce the illusion of an ordinary real time, closed loop television picture (e.g., 30 frames per second). Over exposure is prevented by the short activation duration of the shutter, which activation is kept as short as possible in consonance with the natural light levels and the time of transit of the signal illumination. The spectral filter and the shutter together suppress the natural background such that the system will perform equally well in bright daylight conditions as well as darkness.

The laser flash must be time synchronized with the receiver shutter to assure that the signal light will be detected. This synchronization is to be effected via a radio link between the receiver and the illuminator.

The receiver may utilize a variety of image tubes, for example an image-orthicon, an image-intensifier-vidicon, a multistage image converter (the first stage is shuttered; the output phosphor on the last stage serves as a display screen), etc.

In addition to suppression of background the shutter provides a means for counter-countermeasuring decoys. If the enemy employs blinking light sources comparable to the illuminator, at such a time when the shutter is normally operating in a longer pulse mode (e.g., when the natural background level is low) the receiver operator can use a shortened gate and transmit a command to fire the laser. Under these conditions the only signals that will be displayed will be those due to the friendly, synchronized illuminator.

This invention provides a means whereby an individual soldier, located, for example, on the ground may transfer his knowledge of the location of a target to personnel in a fire support aircraft.

The airborne personnel are made aware of the precise location of a target at standoff ranges and under other circumstances that would otherwise render the target improbably of being detected, identified, and precisely located.

There are two principal subsystems: The illuminator which is deployed and operated by the agent or spotter who acquires the target and a receiver through which the target location is shown to the support personnel. The receiver must have a direct line of sight to the target during the designating period. The spotter aims the illuminator and activates it so that its radiation is projected upon the target. The receiver has such technical characteristics as will render a real time display of the scene containing the target, with the target location in this scene shown as a flash point of light. The unique technical characteristics of the receiver make it so sensitive that a very lightweight, one-man-portable illuminator can be employed without sacrifice of needed ranges of operation flexibility, and facility of use. The illuminator and receiver may be separated by as much as several miles. The illuminator may be distant from the target by several miles and the receiver will sense the illuminated target while yet several miles from it. The system is particularly useful in close ground support military operations by aircraft, but has other uses, as will become obvious from the following description.

Referring now to FIG. 1, numeral 10 designates a pulsed laser illuminator which illuminates a target with a laser beam 12. Reflected illumination 13 from target 12 is detected by an imaging detector 14. Detector 14 includes a shutter which is controlled by a radio link 15 from illuminator 10.

Some time after illuminator 10 sends out a pulse of illumination toward target 11, a radio signal is sent over path 15 to open the shutter of imaging detector 13, to allow the detector to "see" reflected illumination from target 11.

Figure 2:
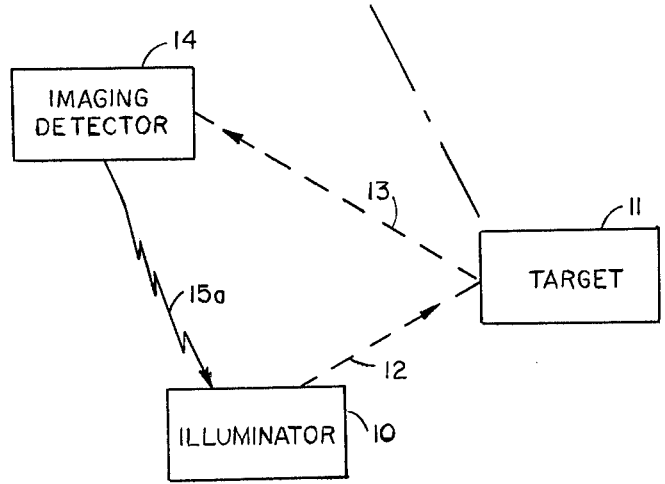
FIG. 2 is a schematic showing of another embodiment of the invention.
Figure 3:
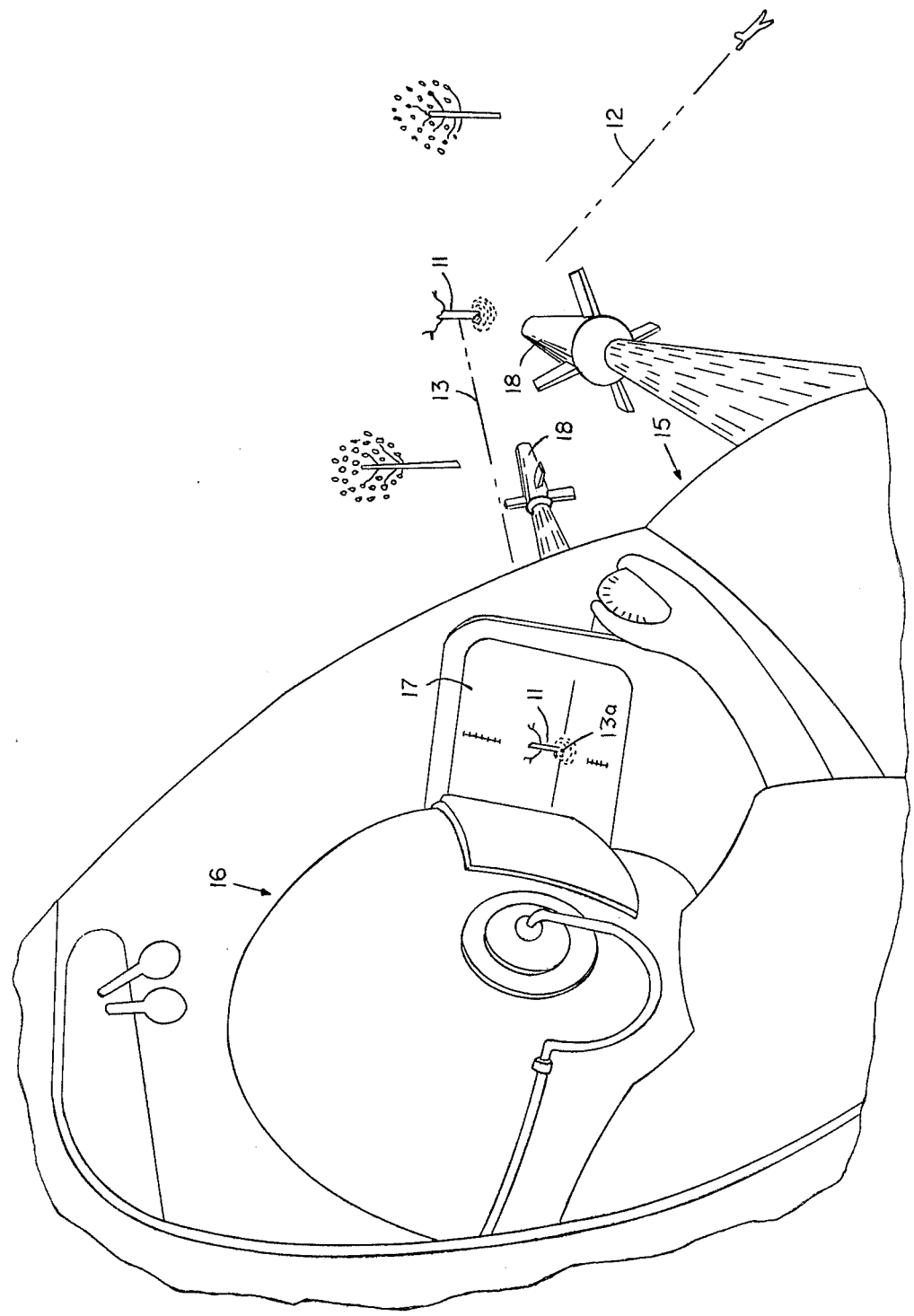
FIG. 3 is a pictoral showing of one manner in which the invention may be used.

FIG. 2 is similar to FIG. 1, except that the pulse of illumination from illuminator 10 are initiated by a radio link 15a from imaging detector 14. The imaging detector initiates such pulses of illumination at some time prior to the opening of the shutter contained in detector 14. Referring now to FIG. 3, a portion of an aircraft 15 is shown, with a pilot, copilot or observer 16 viewing a screen 17 which displays target 11 and the background associated therewith. Screen 17 is a portion of the imaging detector 14 as shown in FIGS. 1 and 2. In addition to the target and its background, the viewer is able to see the reflected laser illumination 13 as a spot 13a on screen 17. Missiles 18 have already been fired toward target 11, which target as shown, is a camouflaged observation post.

Figure 4:
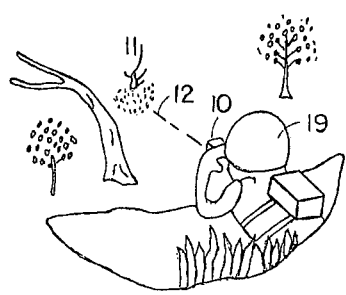
FIG. 4 is an enlarged pictoral showing of a portion of FIG. 3.

Referring now to FIG. 4, a man 19 is shown aiming illuminator 10. The pulses of illumination from 10 may be initiated by the man and the shutter of the imaging detector (not shown except for screen 17) on the aircraft could be opened through a radio link from the illuminator to the detector, in the manner of FIG. 1, or control of the pulses of illumination from 10 may be controlled from the detector, in the manner of FIG. 2.

Figure 5:
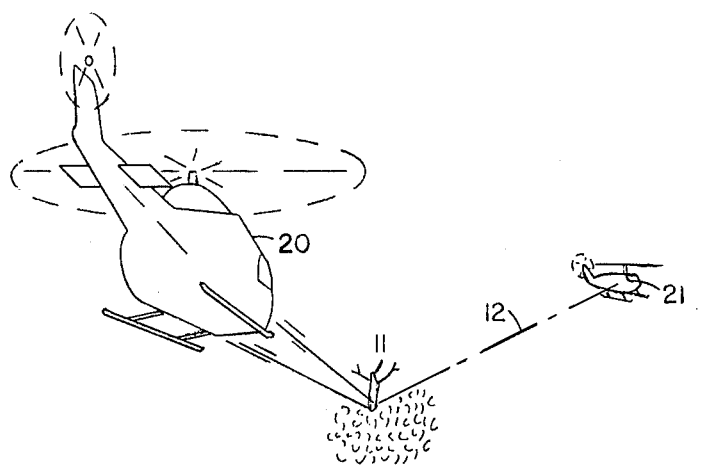
FIG. 5 is another pictoral showing of another manner in which the invention may be used.

Referring now to FIG. 5, a pair of helicopters 20 and 21 are shown operating against a target 11. The laser illuminator is carried by helicopter 21 and the imaging detector is carried by armoured helicopter 20. As shown, helicopter 20 is operating machine guns against target 11. Control of the illuminator and the shutter of the detector could be of either of the manners of FIGS. 1 and 2, as explained above in conjunction with FIGS. 3 and 4.

Figure 6:
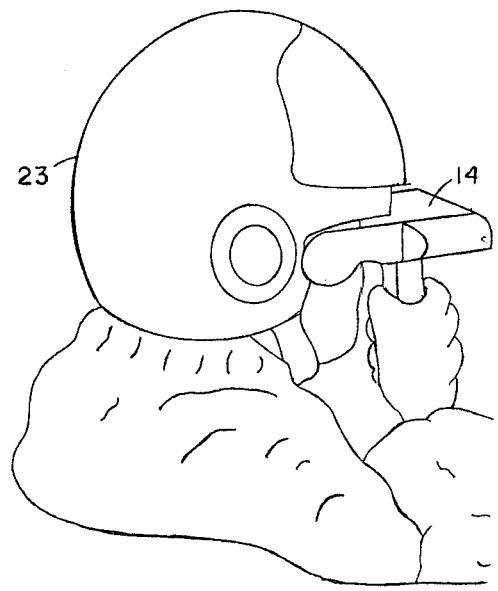
FIG. 6 is an enlarged pictoral showing of a portion of FIG. 5.

FIG. 6 shows the pilot, copilot, or observer 22 of helicopter 20 viewing the target and its background through imaging detector 14.

Figure 7:
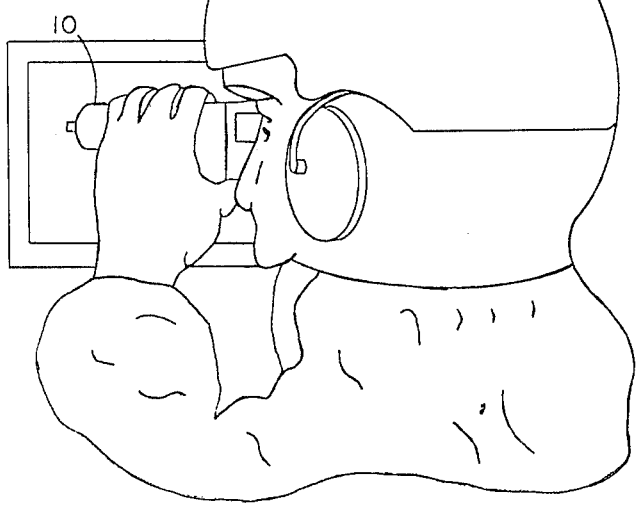
FIG. 7 is an enlarged pictoral showing of another portion of FIG. 5.

FIG. 7 shows a pilot, copilot, or observer 23 operating illuminator 10 against the target.

The invention is particularly useful if the laser provides illumination of an infrared wavelength, since such illumination is invisible to the unaided eye, but can readily be converted to a visible image in imaging detector 14.

Figure 8:
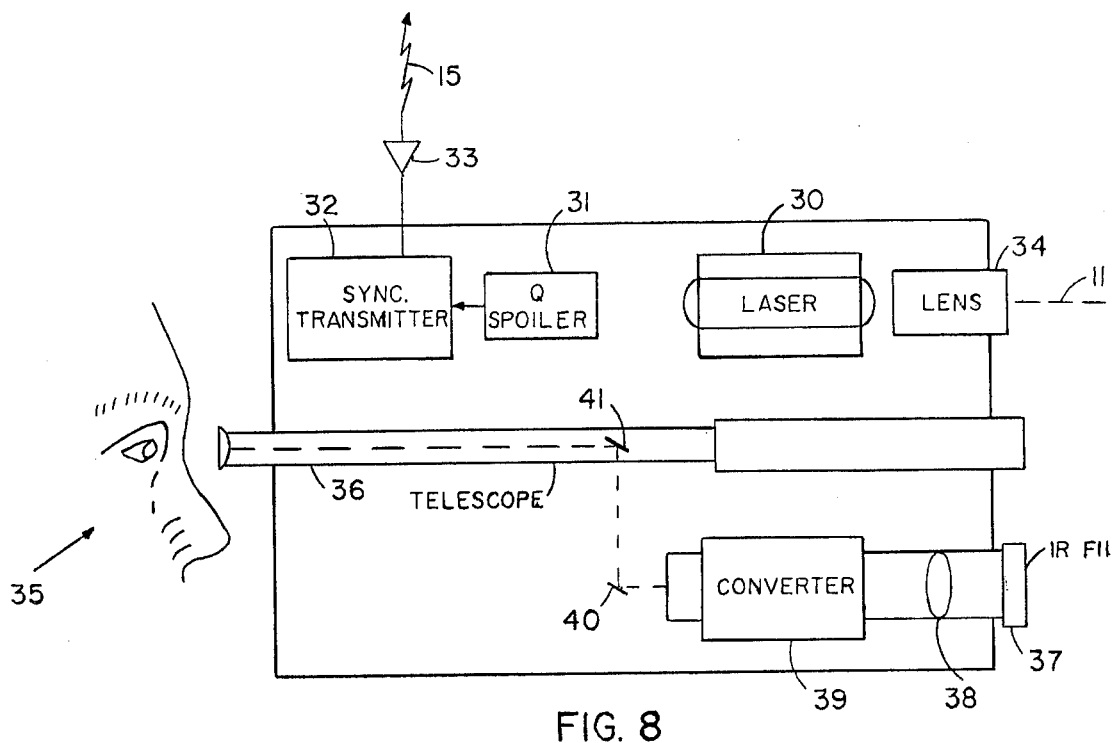
FIG. 8 is a partial schematic showing of a laser illuminator which may be employed in the invention.

Referring to FIG. 8, a specific example of a pulsed laser illuminator which may be used in the invention is shown, with numeral 30 designating the laser and its pump. Pulsing of the laser is obtained with a Q-spoiler, which may take the form of a revolving mirror, in known manner. A shaft pick-off from the revolving mirror may be used to operate a synchronizing transmitter 32, which sends out a signal 15 over antenna 33 when the laser is pulsed. Lens 34 focusses the illumination from the laser and passes it as a beam 12 toward the target (not shown). Operator 35 aims the illuminator toward a target by sighting through a telescope 36. Reflected laser illumination from the target is passed through an IR filter 37 and a lens 38 to an image converter 39 such as the type used in a Snooperscope. The converted image is reflected by full-silvered mirror 40 and partial-silvered mirror 41 throgh telescope 36 to operator 35. The "turning on" of converter 39 is performed after the pulses of laser illumination, at some time interval when reflected illumination could be expected from a target.

Figure 9:
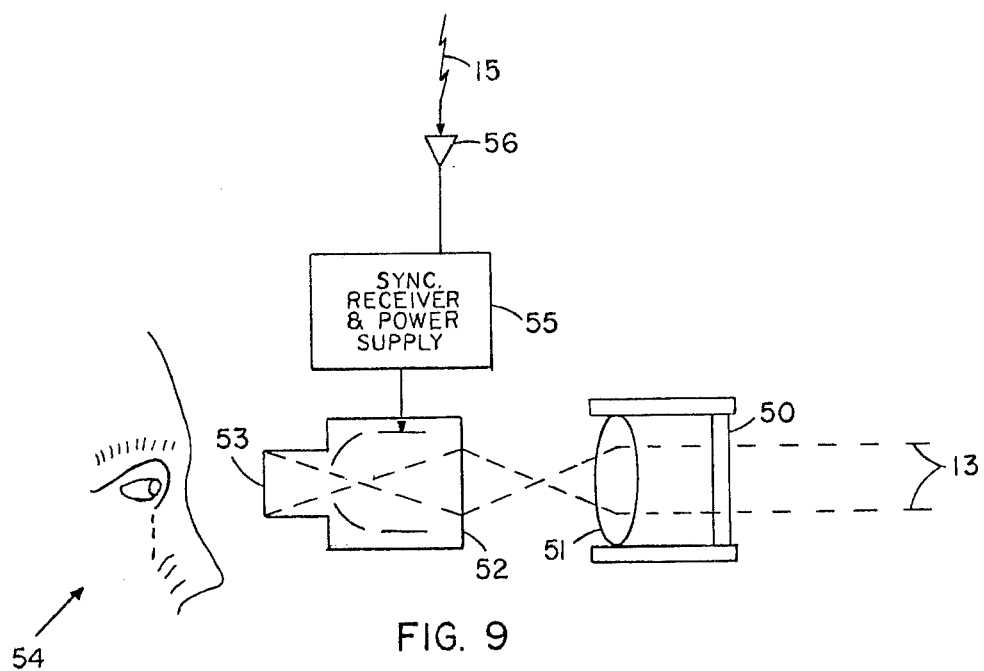
FIG. 9 is a schematic showing of an imaging detector which may be used in the invention.

FIG. 9 shows an imaging detector for reflected illumination 13 from a target. Included in FIG. 9 is an IR filter 50 and a lens 51 for such reflected illumination. An IR image is formed on one surface (52) of image converter tube 52 and a visible image appears on florescent screen 53. The image on 53 is observed by an operator 54, which operator corresponds to the viewers 16 and 23 of FIGS. 3 and 7, respectively. Operation of tube 52 is controlled by a synchronizing receiver and power supply 55, which is periodically operated by signals 15 received on antenna 56.

From the above description, it can be seen that the illuminator of the invention is able to discretely illuminate and particularly designate a target in a cluttered background. This cluttered background may include objects of similar size and reflectivity as the target. As described above, the target may appear as a flash point of light on the scene shown by the receiver of the invention.

While the invention has been specifically described as being useful in airborne operations, it obviously could be used in ground or water operations. The imaging detector could be carried by land or water vehicles, or by a man, and the illuminator could likewise be carried by land or water vehicles or by a man, and the system would be useable against ground, air, or water targets. The invention could be used against emplacements, vehicles, or personnel. Another specific way in which the invention might be employed is with the illuminator carried by a man and used to illuminate targets for tanks, with the imaging detector carried on a tank. Also, the invention could be used to advantage by artillery, and could possibly be used under water.

Yet another way in which the imaging detector of the invention may be used is as a countermeasure. If an enemy were in possession of a system similar to the invention, the imaging detector of the invention would be able to detect the enemy illuminator.

I claim:

1. A designation system for a target in a cluttered background including a pulse laser; a pulse laser beam being emitted by said laser; a Q-spoiler connected to said laser so as to control the frequency of the output of the pulse beams from said laser; a synchronous transmitter connected to said Q-spoiler so as to transmit an output which is indicative of the frequency of the pulse beams; said pulse beam periodically illuminating said target; a remotely located detector; said detector including a first spectral filtering device which will pass illuminations reflected from the target caused by the laser beam and will stop other reflected illuminations; an imaging device; a first lens means passing the reflected laser beam illuminations from said filter to said imaging device; said imaging device having an electronic shutter means; a synchronous receiver means being connected to said electronic shutter so as to operate same; said synchronous receiver means receiving the information transmitted by said transmitter and causing said shutter of said image means to operate in synchronism with the frequency of the pulses of said laser beams; said synchronous transmitter and said synchronous receiver means having a wireless communication link therebetween said imaging means providing a visible image of the target; a focusing lens being located between said laser and said target so as to cause discrete illumination of the target; a telescope device aligned up in the direction of the laser beam and rigidly connected thereto for viewing the area illuminated by said laser and for directing the laser beam to a desired target; a second imaging means having a second spectral filtering device and focusing means for receiving reflected illuminations from the laser beam; and first and second mirror means connected between the second imaging means and the telescope means so as to allow viewing of both a telescope view and an imaged view to an observer.

* * * * *